United States Patent
Li et al.

(10) Patent No.: US 10,038,561 B2
(45) Date of Patent: Jul. 31, 2018

(54) METHOD AND DEVICE FOR GENERATING DIGITAL SIGNATURE

(71) Applicant: CHINA IWNCOMM CO., LTD., Xi'an (CN)

(72) Inventors: Zhiyong Li, Xi'an (CN); Hongtao Wan, Xi'an (CN); Xiang Yan, Xi'an (CN)

(73) Assignee: CHINA IWNCOMM CO., LTD. (CN)

( * ) Notice: Subject to any disclaimer, the term of this patent is extended or adjusted under 35 U.S.C. 154(b) by 54 days.

(21) Appl. No.: 14/911,143

(22) PCT Filed: Aug. 14, 2014

(86) PCT No.: PCT/CN2014/084380

§ 371 (c)(1),
(2) Date: Feb. 9, 2016

(87) PCT Pub. No.: WO2015/021934

PCT Pub. Date: Feb. 19, 2015

(65) Prior Publication Data

US 2016/0191252 A1    Jun. 30, 2016

(30) Foreign Application Priority Data

Aug. 16, 2013 (CN) .......................... 2013 1 0363349

(51) Int. Cl.
*H04L 29/06* (2006.01)
*H04L 9/32* (2006.01)
(Continued)

(52) U.S. Cl.
CPC .......... *H04L 9/3252* (2013.01); *H04L 9/0861* (2013.01); *H04L 9/3066* (2013.01)

(58) Field of Classification Search
CPC ... H04L 9/3252; H04L 9/3066; H04L 9/0861; H04L 9/3247
USPC .......................................................... 380/28
See application file for complete search history.

(56) References Cited

U.S. PATENT DOCUMENTS

2014/0211938 A1* 7/2014 Campagna ............ H04L 9/3252
                                                                    380/44

FOREIGN PATENT DOCUMENTS

CN    101610153 A    12/2009
CN    102761415 A    10/2012
(Continued)

OTHER PUBLICATIONS

Bai, L., Zhang, Y., & Yang, G. (Apr. 2012). SM2 cryptographic algorithm based on discrete logarithm problem and prospect. In Consumer Electronics, Communications and Networks (CECNet), 2012 2nd International Conference on (pp. 1294-1297). IEEE.*
(Continued)

*Primary Examiner* — Syed Zaidi
(74) *Attorney, Agent, or Firm* — DLA Piper LLP (US)

(57) ABSTRACT

Disclosed are a method and device for generating a digital signature. The method comprises: a device generating a digital signature parameter r that meets an effective determining condition; generating a digital signature parameter s according to the following formula $s=((1+d_A)^{-1} \cdot (r+k)-r)$ mod n, by using a private key $d_A$, a random number k, r, and an elliptic curve parameter n, a value range of k being [1, n−1]; determining if the generated s is 0; if s is 0, regenerating r that meets the effective determining condition, and regenerating s by using $d_A$, the regenerated k with the value range of [1, n−1] and the regenerated r and n, until s is not 0; converting data types of r and s that is not 0 into byte strings, to obtain a digital signature (r, s). According to the technical solutions provided by embodiments of this application, a digital signature parameter s is obtained by using a simplified calculation formula, and the number of times that big integers are calculated can be reduced, so that the calculation efficiency of generating a digital signature based on an SM2 digital signature generation algorithm is improved.

13 Claims, 4 Drawing Sheets

(51) Int. Cl.
  *H04L 9/30*  (2006.01)
  *H04L 9/08*  (2006.01)

(56)  References Cited

FOREIGN PATENT DOCUMENTS

| | | |
|---|---|---|
| CN | 103427997 A | 12/2013 |
| JP | 2005-148141 | 6/2005 |
| KR | 2001-0068651 | 7/2001 |

OTHER PUBLICATIONS

Liu, Yanhua, et al. "An Efficient Scheme for Implementation of SM2 Digital Signature over GF (p)." Contemporary Research on E-business Technology and Strategy. Springer Berlin Heidelberg, Aug. 2012. 250-258.*
Supplementary European Search Report dated Jul. 18, 2016, of corresponding European Application No. 14836006.8.
Shen, S., "SM2 Digital Signature Algorithm; draft-shen-sm2-ecdsa-01.txt," SM2 Digital Signature Algorithm, Internet Engineering Taskforce, Jul. 14, 2013, pp. 1-40.
European Communication dated Nov. 15, 2017, of corresponding European Application No. 14836006.8.
Eigenwillig, A., et al., "Multiplication of Long Integers (Faster than Long Multiplication)," *Max Planck Institute for Informatics*, Jan. 1, 2011, XP055423427.

\* cited by examiner

METHOD AND DEVICE FOR GENERATING DIGITAL SIGNATURE

This application is a US National Stage of International Application No. PCT/CN2014/084380, filed Aug. 14, 2014, designating the United States, and claiming the benefit of Chinese Patent Application No. 201310363349.7, filed with the State Intellectual Property Office of People's Republic of China on Aug. 16, 2013 and entitled "Method and device for generating digital signature", the content of which is hereby incorporated by reference in its entirety.

FIELD

The present invention relates to the field of information technologies and particularly to a method and device for generating a digital signature.

BACKGROUND

The SM2 digital signature algorithm which is a component of the Public Key Cryptographic Algorithm SM2 Based on Elliptic Curves has been well applied in the field of user identity authentication and information integrity check functions. The operational efficiency of the SM2 digital signature algorithm has been the focus of attention by the users of the algorithm being applied. The SM2 digital signature algorithm is consisted of the SM2 digital signature generation algorithm and the SM2 digital signature verification algorithm.

If M represents a message to be signed, then in order to obtain a digital signature (r, s) of the message M, to be used by a user A, this can be performed in the following SM2 digital signature generation algorithm:

A1: Set $\overline{M}=Z_A\|M$.

Where $\|$ represents a cascading operation, and $Z_A$ represents a hash value of the user A, obtained in a cryptographic hash function, to generate the digital signature.

A2: Calculate $e=H_v(\overline{M})$, and convert the data type of e from a string of bits into an integer.

Where $H_v(\ )$ represents a cryptographic hash function with a message digest length of v bits, e.g., the SM3 Cryptographic Hash Algorithm.

A3: Generate a random number $k \in [1, n-1]$ using a random number generator.

Where n represents a parameter of an elliptical curve.

A4: Calculate a point $(x_1,y_1)=[k]G$ on the elliptical curve, where $x_1$ represents a field element, and convert the data type of $x_1$ into an integer.

Where G represents a basic point on the elliptical curve, and $[k]G$ represents the point multiplication of k and G.

The type of an equation of the elliptical curve can be a prime number field equation $y^2=x^3+ax+b$ or a binary field equation $y^2+xy=x^3+ax^2+b$.

A5: Calculate $$r=(e+x_1) \bmod n \qquad \text{Equation 1}$$

That is, a modular operation is performed on n using $(e+x_1)$.

If r=0 or r+k=n, then A3 is returned.

A6: Calculate $$s=((1+d_A)^{-1} \cdot (k-r \cdot d_A)) \bmod n \qquad \text{Equation 2}$$

If s=0, then A3 is returned.

Where $d_A$ represents a private key of the user A.

A7: Convert the data type of r and s from an integer into a string of bytes, and the digital signature of the message M is (r, s).

The user A can be a system or a device, and the SM2 digital signature generation algorithm can be performed by a subsystem or a hardware module arranged in the user A, a software module executable in the user A, etc., or can be a system or a device, in communication with the user A, invoked by the user A.

The user A is provided with a distinguishable identity $ID_A$ with the length of $entlen_A$ bits, where $ENTL_A$ represents two bytes into which an integer $entlen_A$ is converted. In the SM2 digital signature generation algorithm, the data type of the coordinates $x_G$ and $y_G$ of G, and the coordinates $x_A$ and $y_A$ of $P_A$ are converted into a string of bits, so $Z_A=H_{256}(ENTL_A\|ID_A\|a\|b\|x_G\|y_G\|x_A\|y_A)$, where $P_A$ represents a public key of the user A, and $H_{256}(\ )$ represents a cryptographic hash function with a message digest length of 256 bits, e.g., the SM3 Cryptographic Hash Algorithm.

Moreover in a particular engineering implementation, those skilled in the art typically transform Equation 2 as in Equation 3 and Equation 4 below by converting a negative integral power algorithm, i.e., $(1+d_A)^{-1}$, into performing a modular inverse algorithm, i.e., $(1+d_A)^{-1} \bmod n$, to thereby facilitate the engineering implementation.

$$s=(((1+d_A)^{-1} \bmod n) \cdot ((k-r-d_A) \bmod n)) \bmod n \qquad \text{Equation 3}$$

$$s=(((1+d_A)^{-1} \bmod n) \cdot ((k-(r-d_A) \bmod n) \bmod n)) \bmod n \qquad \text{Equation 4}$$

The SM2 digital signature generation algorithm is performed based upon the theory of the ECC algorithm where large integer multiplication, large integer modular multiplication, and other large integer operations are the most significant factor to influence the operational efficiency of the algorithm, and although the existing SM2 digital signature generation algorithm can satisfy some demand for the operational efficiency, it may be desirable to further improve the operational efficiency, and there has been absent a corresponding solution in the prior art.

SUMMARY

The object of the invention is to provide a method and device for generating a digital signature so as to further improve the operational efficiency of generating a digital signature in the SM2 digital signature generation algorithm.

The object of the invention is attained by the following technical solutions:

A method for generating a digital signature includes:

generating, by a device, a digital signature parameter r satisfying a validity judgment condition;

generating, by the device, a digital signature parameter s using a private key $d_A$, a random number k in the range [1, n−1], the digital signature parameter r, and an elliptical curve parameter n in the equation of:

$$s=((1+d_A)^{-1} \cdot (r+k)-r) \bmod n;$$

judging, by the device, whether the digital signature s is 0, and if the digital signature s is 0, then regenerating a digital signature parameter r satisfying the validity judgment condition, and regenerating the digital signature parameter s using the private key $d_A$, a regenerated random number k in the range [1, n−1], the digital signature parameter r regenerated, and the elliptical curve parameter n until the digital signature parameter s is not 0; and converting, by the device, the data type of the resulting digital signature parameter r and digital signature parameter s which is not 0 into a string of bytes to obtain a digital signature (r, s).

The method according to the embodiment of the invention can obtain the digital signature parameter s by lowering the number of large integer operations to thereby improve the operational efficiency of generating a digital signature in the SM2 digital signature algorithm.

Preferably generating, by the device, the digital signature parameter s in the equation of $s=((1+d_A)^{-1}\cdot(r+k)-r)$ mod n includes:

after performing a large integer addition operation on the digital signature parameter r and the random number k, performing, by the device, an operation of a result (r+k) of the large integer addition operation modulo the elliptical curve parameter n;

after adding 1 to the private key $d_A$, calculating, by the device, a modular inverse of $(1+d_A)$ modulo the elliptical curve parameter n;

performing, by the device, a large integer multiplication operation on a result of the large integer addition operation result modulo n, and a result of the modular inverse; and after subtracting the digital signature parameter r from a result of the large integer multiplication operation, performing, by the device, an operation of a result of the large integer multiplication operation, after the digital signature parameter r being subtracted, modulo the elliptical curve parameter n to obtain the digital signature parameter s.

The digital signature parameter s can be generated in the process above to thereby dispense with one large integer multiplication or one large integer modular multiplication operation.

Further to any one of the embodiments above, preferably before the digital signature parameter s is generated, the method further includes:

obtaining, by the device, an operation result r+k of the validity judgment condition on r to generate the digital signature parameter s using the private key $d_A$, the operation result r+k of the validity judgment condition on r, the digital signature parameter r, and the elliptical curve parameter n.

The digital signature parameter s can be generated directly using the operation result (r+k) of the validity judgment condition on r to thereby further improve the operational efficiency.

Further to any one of the embodiments above, preferably before the digital signature parameter s is generated, the method further includes:

obtaining, by the device, an operation result (r+k)mod n of the validity judgment condition on r to generate the digital signature parameter s using the private key $d_A$, the operation result (r+k)mod n of the validity judgment condition on r, the digital signature parameter r, and the elliptical curve parameter n.

An operation of $(r\cdot d_A)$mod n can be avoided to thereby dispense with one large integer modular multiplication operation.

A device for generating a digital signature includes:

a parameter input interface unit configured to obtain a hash value $Z_A$ and a message M to be signed;

a cascading operating unit configured to perform a cascading operation on the hash value $Z_A$, and the message M to be signed, obtained by the parameter input interface unit to generate $\overline{M}$;

a cryptographic hash algorithm operating unit configured to perform a cryptographic hash operation on $\overline{M}$ generated by the cascading operating unit to generate message digest information e;

a random number generator configured to generate a random number k in the range [1, n−1];

an Elliptic Curves Cryptography, ECC, algorithm operating unit configured to perform an elliptical curve point multiplication operation $(x_1,y_1)=kG$ according to the random number k generated by the random number generator to obtain the abscissa $x_1$ of an elliptical curve point, wherein G represents an elliptical curve parameter;

a data type converting unit configured to convert the data type of the message digest information e generated by the cryptographic hash algorithm operating unit into an integer type, and further convert the data type of the abscissa $x_1$ of the elliptical curve point, generated by the ECC algorithm operating unit into an integer type;

a large integer operating unit configured to generate a digital signature parameter r using the message digest information e and abscissa $x_1$ of the elliptical curve point converted by the data type converting unit;

a validity judgment unit configured to judge the validity of the digital signature parameter r generated by the large integer operating unit;

if the digital signature parameter r does not satisfy a validity judgment condition, then the random number generator regenerates a random number k in the range [1, n−1]; the ECC algorithm operating unit obtains again an abscissa $x_1$ of an elliptical curve point using the random number k regenerated by the random number generator; the data type converting unit converts the data type of the abscissa $x_1$ of the elliptical curve point, obtained again; the large integer operating unit regenerate a digital signature parameter r using the message digest information e and the abscissa $x_1$ of the elliptical curve point converted; and the validity judgment unit judges again the validity of the digital signature parameter r regenerated using the digital signature parameter r regenerated and the random number k regenerated;

wherein the large integer operating unit is further configured to generate a digital signature parameter s using a private key $d_A$, the random number k generated by the random number generator, the digital signature parameter r, and an elliptical curve parameter n in the equation of: $s=((1+d_A)^{-1}\cdot(r+k)-r)$ mod n;

the validity judgment unit is further configured to judge whether the digital signature parameter s generated by the large integer operating unit is 0; if the digital signature parameter s is 0, then the random number generator regenerates a random number k in the range [1, n−1], and the large integer operating unit regenerates a digital signature parameter r, and if the digital signature parameter r regenerated satisfies the validity judgment condition, then the large integer operating unit regenerates a digital signature parameter s using the private key $d_A$, the random number k regenerated in the range [1, n−1], the digital signature parameter r regenerated, and the elliptical curve parameter n;

the data type converting unit is further configured to convert the data type of the digital signature parameter r, and the digital signature parameter s which is not 0, finally generated by the large integer operating unit into a string of bytes to obtain a digital signature (r, s); and a parameter output interface unit configured to output the digital signature (r, s).

The device according to the embodiment of the invention can obtain the digital signature parameter s by lowering the number of large integer operations to thereby improve the operational efficiency of generating a digital signature in the SM2 digital signature algorithm.

Preferably the large integer operating unit configured to generate the digital signature parameter s is configured:

to perform a large integer addition operation on the digital signature parameter r, and the random number k generated by the random number generator, and then perform an operation of a result (r+k) of the large integer addition operation modulo the elliptical curve parameter n;

to add 1 to the private key $d_A$, and then calculate a modular inverse of $(1+d_A)$ modulo the elliptical curve parameter n;

to perform a large integer multiplication operation on a result of the large integer addition operation result modulo n, and a result of the modular inverse; and to subtract the digital signature parameter r from a result of the large integer multiplication operation, and then perform an operation of a result of the large integer multiplication operation, after the digital signature parameter r being subtracted, modulo the elliptical curve parameter n to obtain the digital signature parameter s.

The digital signature parameter s can be generated in the process above to thereby dispense with one large integer multiplication or one large integer modular multiplication operation.

Further to any one of the embodiments above of the device, preferably if the validity judgment unit judges the validity of the digital signature parameter r using an operation result r+k of the validity judgment condition on the digital signature parameter r, then the large integer operating unit further generates the operation result r+k of the validity judgment condition on the digital signature parameter r using the digital signature parameter r generated, and the random number k generated by the random number generator after generating the digital signature parameter r; and the large integer operating unit configured to generate the digital signature parameter s is configured:

to perform an operation of result (r+k) modulo the elliptical curve parameter n;

to add 1 to the private key $d_A$, and then calculate a modular inverse of $(1+d_A)$ modulo the elliptical curve parameter n;

to perform a large integer multiplication operation on a result of (r+k) modulo n, and a result of the modular inverse; and to subtract the digital signature parameter r from a result of the large integer multiplication operation, and then perform an operation of a result of the large integer multiplication operation, after the digital signature parameter r being subtracted, modulo the elliptical curve parameter n, resulting in the digital signature parameter s.

The digital signature parameter s can be generated directly using the operation result (r+k) of the validity judgment condition on r to thereby further improve the operational efficiency.

Further to any one of the embodiments above of the device, preferably if the validity judgment unit judges the validity of the digital signature parameter r using an operation result (r+k) mod n of the validity judgment condition on the digital signature parameter r, then the large integer operating unit further generates the operation result (r+k) mod n the validity judgment condition on the digital signature parameter r using the digital signature parameter r generated, the random number k generated by the random number generator, and the elliptical curve parameter n after generating the digital signature parameter r; and the large integer operating unit configured to generate the digital signature parameter s is configured:

to add 1 to the private key $d_A$, and then calculate a modular inverse of $(1+d_A)$ modulo the elliptical curve parameter n;

to perform a large integer multiplication operation on the operation result (r+k) mod n and a result of the modular inverse; and to subtract the digital signature parameter r from a result of the large integer multiplication operation, and then perform an operation of a result of the large integer multiplication operation, after the digital signature parameter r being subtracted, modulo the elliptical curve parameter n to obtain the digital signature parameter s.

An operation of $(r \cdot d_A)$ mod n can be avoided to thereby dispense with one large integer modular multiplication operation.

Further to any one of the embodiments above, the private key $d_A$ used by the large integer operating unit can be generated by the device, or can be obtained from the outside, as described below by way of an example.

First Implementation:

The device further includes:

a key generating unit configured to generate the private key $d_A$; and a key storing unit configured to store the private key $d_A$ generated by the key generating unit; and the large integer operating unit obtains the private key $d_A$ from the key storing unit to generate the digital signature parameter s.

Second Implementation:

the parameter input interface unit is further configured to obtain the private key $d_A$; and the large integer operating unit obtains the private key $d_A$ from the parameter input interface unit to generate the digital signature parameter s.

Third Implementation:

the device further includes a key storing unit; the parameter input interface unit is further configured to obtain the private key $d_A$; the key storing unit is configured to store the private key $d_A$ obtained by the parameter input interface unit; and the large integer operating unit obtains the private key $d_A$ from the key storing unit to generate the digital signature parameter s.

DETAILED DESCRIPTION OF THE EMBODIMENTS

Embodiments of the invention provide a technical solution to generation of a digital signature, where after a digital signature parameter r satisfying a validity judgment condition is generated, a device generates a digital signature parameter s using a private key $d_A$, a random number k in the range [1, n−1], the digital signature parameter r, and an elliptical curve parameter n in the equation of: $s = ((1+d_A)^{-1} \cdot (r+k) - r) \bmod n$, and judges whether the digital signature parameter s is 0; and if the digital signature parameter s is 0, then the device regenerates a digital signature parameter r satisfying the validity judgment condition, and regenerates a digital signature parameter s using the private key $d_A$, a regenerated random number k in the range [1, n−1], the digital signature parameter r regenerated, and the elliptical curve parameter n until the digital signature parameter s is not 0 to obtain a digital signature (r, s) by converting the data type of the resulting digital signature parameter r and digital signature parameter s which is not 0 into a string of bytes. The digital signature parameter s can be obtained with a smaller number of large integer operations to thereby improve the operational efficiency of generating a digital signature in the SM2 digital signature generation algorithm.

The technical solution according to the embodiments of the invention will be described below in details with reference to the drawings.

Figure 1:
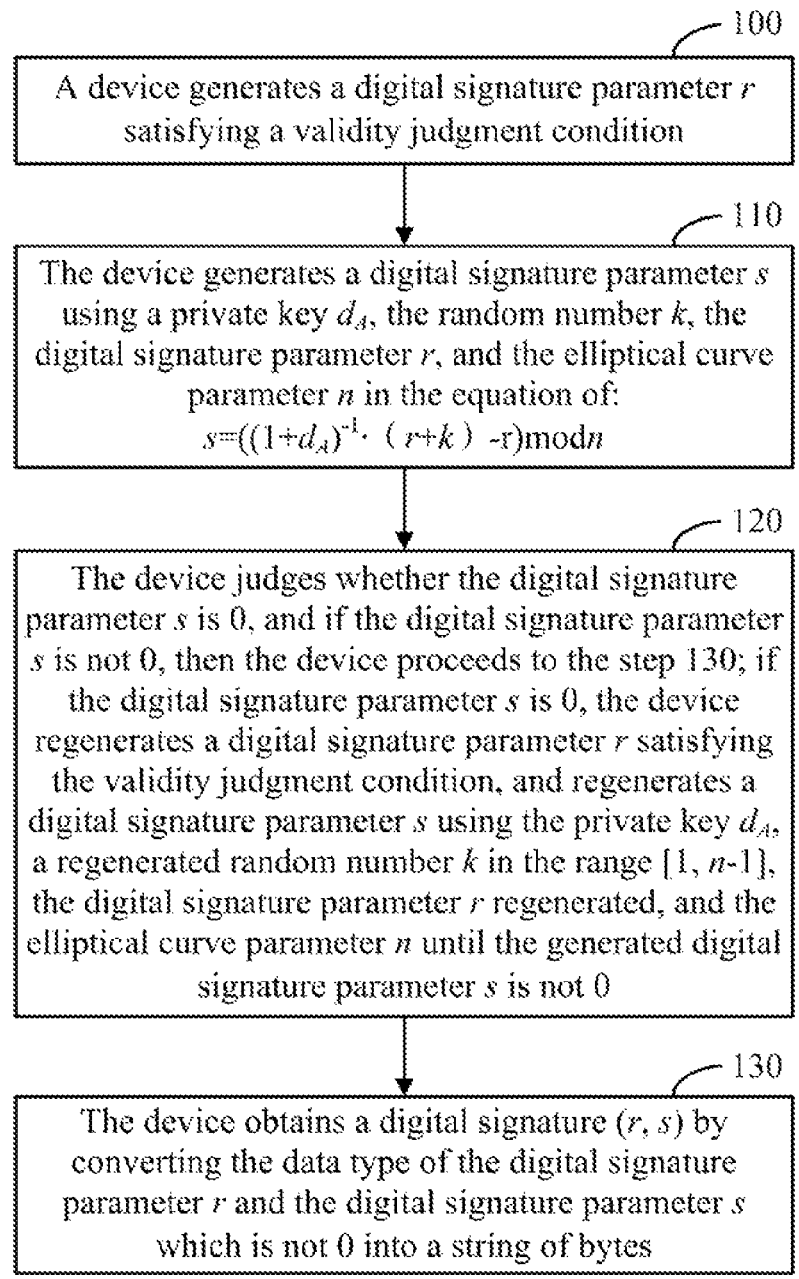
FIG. 1 illustrates a flow chart of a first method according to an embodiment of the invention.

FIG. 1 illustrates a method for generating a digital signature according to an embodiment of the invention, which particularly includes the following operations:

Operation 100. A device generates a digital signature parameter r satisfying a validity judgment condition.

Here the validity judgment condition being satisfied refers to the digital signature parameter r generated by the device not being 0, and r+k not being n, where n represents an elliptical curve parameter, and k represents a random number in the range of [1, n−1].

The digital signature parameter r satisfying the validity judgment condition can be generated in the same way as in the SM2 digital signature generation algorithm without any limitation thereto.

Operation 110. The device generates a digital signature parameters using a private key $d_A$, the random number k in the range [1, n−1], the digital signature parameter r, and the elliptical curve parameter n in the equation of:

$$s=((1+d_A)^{-1} \cdot (r+k)-r) \bmod n \qquad \text{Equation 5}$$

Where Equation 2 above is simplified into Equation 5 so that the digital signature parameter s can be generated in Equation 5 without performing the operation $r \cdot d_A$ to thereby dispense with one large integer operation. Equation 2 is simplified as follows:

$$\begin{aligned} s &= ((1+d_A)^{-1} \cdot (k - r \cdot d_A)) \bmod n \\ &= ((1+d_A)^{-1} \cdot (k - r \cdot d_A + r - r)) \bmod n \\ &= ((1+d_A)^{-1} \cdot ((r+k) - r(1+d_A))) \bmod n \\ &= ((1+d_A)^{-1} \cdot (r+k) - r) \bmod n \end{aligned}$$

Where the private key $d_A$ is a private key of a digital signature user (e.g., the user A above). The digital signature user can be a system or a device, and particularly the digital signature user can be a User Equipment (UE), or can be a network node participating in identity authentication, e.g., an eNB, a Mobile Management Entity (MME), etc.

Operation 120. The device judges whether the digital signature s is 0, and if the digital signature s is not 0, then the device proceeds to the step 130; if the digital signature s is 0, the device regenerates a digital signature parameter r satisfying the validity judgment condition, and regenerates a digital signature parameter s using the private key $d_A$, a regenerated random number k in the range [1, n−1], the regenerated digital signature parameter r, and the elliptical curve parameter n until the generated digital signature parameter s is not 0.

Operation 130. The device obtains a digital signature (r, s) by converting the data type of the resulting digital signature parameter r and digital signature parameter s which is not 0 into a string of bytes.

A digital signature generator (i.e., the device above) performing the operations above can be a subsystem or a hardware module arranged in the digital signature user, a software module executable in the digital signature user, etc., or can be a system or device, in communication with the digital signature user, invoked by the digital signature user.

As for the private key of the digital signature user, if the digital signature generator is a subsystem or a hardware module arranged in the digital signature use, a software module executable in the digital signature use, etc., then the digital signature generator can generate and store the key. As for the private key of the digital signature user, the digital signature generator can alternatively obtain and store it from the digital signature user, or can obtain and apply it from the digital signature user without storing it.

In a real application, the digital signature parameter s can be obtained in Equation 5 particularly in a number of implementations to thereby dispense with one large integer multiplication operation or large integer modular multiplication operation.

In a preferred implementation, the device generates the digital signature parameter s using the private key $d_A$, the random number k, the digital signature parameter r, and the elliptical curve parameter n in the equation of:

$$s=(((1+d_A)^{-1} \bmod n) \cdot ((r+k) \bmod n) - r) \bmod n \qquad \text{Equation 6}$$

$s=((1+d_A)^{-1} \cdot (r+k) \cdot r) \bmod n$ is transformed into Equation 6.

Stated otherwise, after a large integer addition operation is performed on the digital signature parameter r and the random number k, the device performs an operation of a result (r+k) of the large integer addition operation modulo the elliptical curve parameter n; and after 1 is added to the private key $d_A$, the device calculates a modular inversion of $(1+d_A)$ modulo the elliptical curve parameter n, performs a large integer multiplication operation on a results of the large integer addition operation result modulo n and a result of the modular inverse, and after subtracting the digital signature parameter r from a result of the large integer multiplication operation, performs an operation of a result of the large integer multiplication operation, after the digital signature parameter r being subtracted, modulo the elliptical curve parameter n to obtain the digital signature parameters.

The equation is simplified as follows:

$$\begin{aligned} s &= ((1+d_A)^{-1} \cdot (r+k) - r) \bmod n \\ &= ((((1+d_A)^{-1} \bmod n) \cdot ((r+k) \bmod n)) \bmod n - r \bmod n) \bmod n \\ &= (((1+d_A)^{-1} \bmod n) \cdot ((r+k) \bmod n) - r) \bmod n \end{aligned}$$

In this preferred implementation, the digital signature parameter s is calculated in Equation 6.

It shall be noted that the digital signature parameter s can be generated in another particular implementation than this preferred embodiment. Since simplified Equation 5 has been suggested in the embodiment of the invention, a particular implementation in Equation 5 can occur to those skilled in the art without any inventive effort and thus will fall into the scope of the invention.

Further any one of the embodiments above, in order to further improve the operational efficiency of generating the digital signature, the operation result r+k of the validity judgment condition on r can be further obtained before the digital signature parameter s is generated. The device can generate the digital signature parameter s directly using the operation result r+k of the validity judgment condition on r, the private key $d_A$, the digital signature parameter r, and the elliptical curve parameter n.

Further any one of the embodiments above, in order to further improve the operational efficiency of generating the digital signature, the operation result (r+k)mod n of the validity judgment condition on r can be further obtained before the digital signature parameter s is generated. The device can generate the digital signature parameter s directly using the operation result (r+k)mod n of the validity judgment condition on r, the private key $d_A$, the digital signature parameter r, and the elliptical curve parameter n. In this preferred implementation, the judgment on the validity of r according to the operation result (r+k) modulo n, i.e., (r+k) mod n is equivalent to the judgment on the validity of r according to the operation result r+k of the validity judgment condition because in the SM2 digital signature generation algorithm, both the ranges of the digital signature parameter r and the random number k are [1, n−1], so the range of r+k is [2, 2n−2], which means that (r+k) mod n=0 is equivalent to r+k=n. Accordingly the digital signature parameter r satisfying the judgment condition can be generated by judging whether (r+k) mod n=0 instead of whether r+k=n.

If a message M to be signed, then an implementation of a digital signature (r, s) of M obtained will be described below in details with reference to FIG. 2 taking Equation 6 as an example. This implementation particularly includes the following operations:

Operation 200. A cascading operation is performed on a hash value of a digital signature user, and a message M, that is, $\overline{M}=Z_A\|M$ is set.

Operation 210. Message digest information e is obtained, that is, $e=H_v(\overline{M})$ is calculated, and the data type of e is converted from a string of bits into an integer type.

Operation 220. A random number $k \in [1, n-1]$ is generated using a random number generator.

Operation 230. A point $(x_1,y_1)=[k]G$ on an elliptical curve is calculated, where $x_1$ represents a field element, and the data type of $x_1$ is converted into an integer type.

Operation 240. A digital signature parameter r is generated, that is, r is calculated as $$r=(e+x_1)\bmod n \quad\quad\quad \text{Equation 1}$$

Operation 250. Validity judgment is made on r: if t=r+k, then the values of r and t are judged so that if r=0 or t=n, then r does not satisfy a validity judgment condition, and the flow goes back to the operation 220; and if r≠0 and t≠n, then r satisfies the validity judgment condition, and the flow proceeds to the operation 260.

Operation 260. A digital signature parameter s is generated using a private key $d_A$ of the digital signature user, an operation result r+k of the validity judgment condition on r, the digital signature parameter r, and an elliptical curve parameter n in the equation of:

$$s=(((1+d_A)^{-1} \bmod n)\cdot(t \bmod n)-r)\bmod n \quad\quad\quad \text{Equation 7}$$

It shall be noted that Equation 7 is substantially the same as Equation 6 above except that Equation 7 represents that the digital signature parameter s is generated using the operation result r+k of the validity judgment condition on r without recalculating r+k.

Operation 270. It is judged whether the value of s is 0, and if s is 0, then the flow goes back to the operation 220; if s is not 0, the flow proceeds to the operation 280.

Operation 280. The data type of the digital signature parameters r and s obtained is converted from an integer into a string of bytes to obtain a digital signature (r, s) of the message M.

Figure 2:
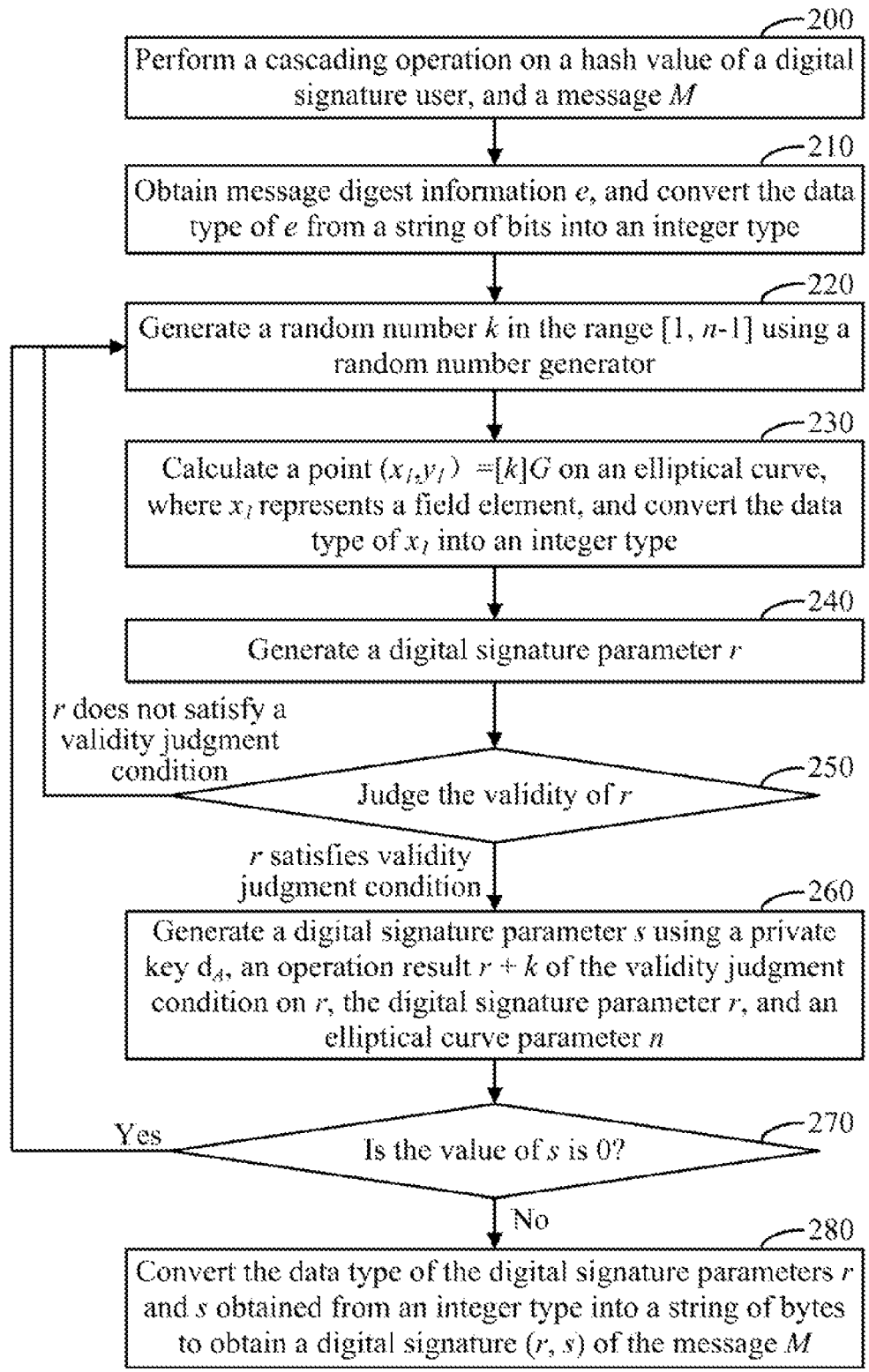
FIG. 2 illustrates a flow chart of a second method according to an embodiment of the invention.

In the embodiment illustrated in FIG. 2, the digital signature parameter s can be generated in Equation 7 to thereby dispense with one large integer multiplication operation or one large integer modular multiplication operation, and the digital signature parameter s can be generated in Equation 7 directly using the operation result r+k of the validity judgment condition on r to thereby further improve the operational efficiency.

If a message to be signed is M, then an implementation of obtaining a digital signature (r, s) of M will be described below in details with reference to FIG. 3 taking Equation 6 as an example. This implementation particularly includes the following operations:

Operation 300. A cascading operation is performed on a hash value of a digital signature user, and a message M, that is, $\overline{M}=Z_A\|M$ is set.

Operation 310. Message digest information e is obtained, that is, $e=H_v(\overline{M})$ is calculated, and the data type of e is converted from a string of bits into an integer.

Operation 320. A random number $k \in [1, n-1]$ is generated using a random number generator.

Operation 330. A point $(x_1, y_1)=[k]G$ on an elliptical curve is calculated, where $x_1$ represents a field element, and the data type of $x_1$ is converted into an integer type.

Operation 340. A digital signature parameter r is generated, that is, r is calculated as $$r=(e+x_1)\bmod n \quad\quad\quad \text{Equation 1}$$

Operation 350. Validity judgment is made on r: if t=(r+k) mod n, then the values of r and t are judged so that if r=0 or t=n, then r does not satisfy a validity judgment condition, and the flow goes back to the operation 320; and if r≠0 and t≠n, then r satisfies the validity judgment condition, and the flow proceeds to the operation 360.

Operation 360. A digital signature parameter s is generated using a private key $d_A$ of the digital signature user, an operation result (r+k) mod n of the validity judgment condition on r, the digital signature parameter r, and an elliptical curve parameter n in the equation of:

$$s=(((1+d_A)^{-1} \bmod n)\cdot t-r)\bmod n \quad\quad\quad \text{Equation 8}$$

It shall be noted that Equation 8 is substantially the same as Equation 6 above except that Equation 8 represents that the digital signature parameter s is generated using the operation result (r+k) mod n of the validity judgment condition on r without recalculating (r+k)mod n.

Operation 370. It is judged whether the value of s is 0, and if the value of s is 0, then the flow goes back to the operation 320; if the value of s is not 0, the flow proceeds to the operation 380.

Operation 380. The data type of the digital signature parameters r and s obtained is converted from an integer into a string of bytes to obtain a digital signature (r, s) of the message M.

Figure 3:
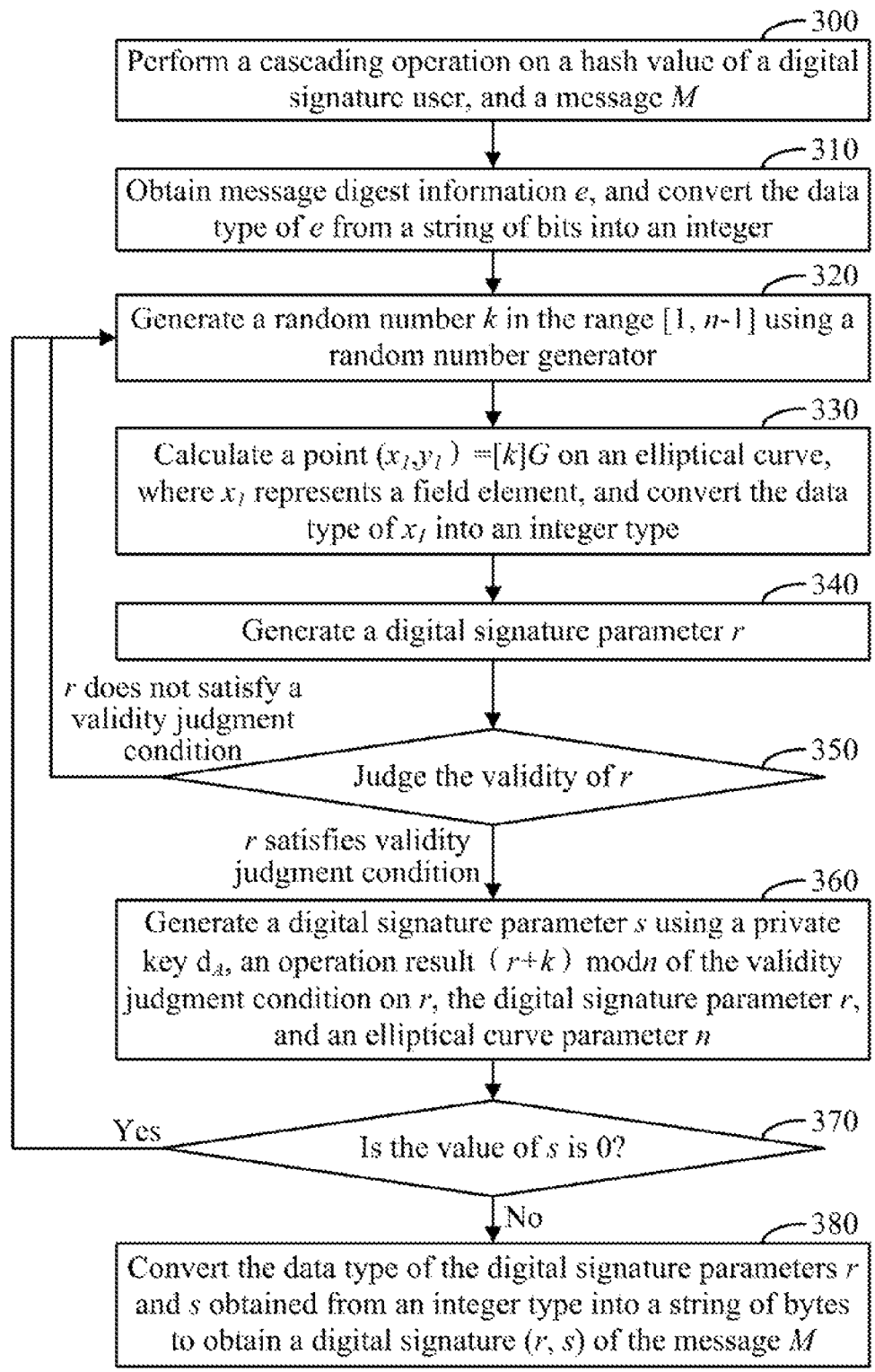
FIG. 3 illustrates a flow chart of a third method according to an embodiment of the invention.

In the embodiment illustrated in FIG. 3, the digital signature parameter s can be generated in Equation 8 to thereby dispense with one large integer multiplication operation or one large integer modular multiplication operation, and the digital signature parameter s can be generated in Equation 8 directly using the operation result (r+k) mod n of the validity judgment condition on r to thereby further improve the operational efficiency.

Moreover it shall be noted that the method for generating a digital signature can be improved using the solution of the invention by dispensing with one large integer multiplication operation from Equation 3 and with one large integer modular multiplication operation from Equation 4.

Figure 4:
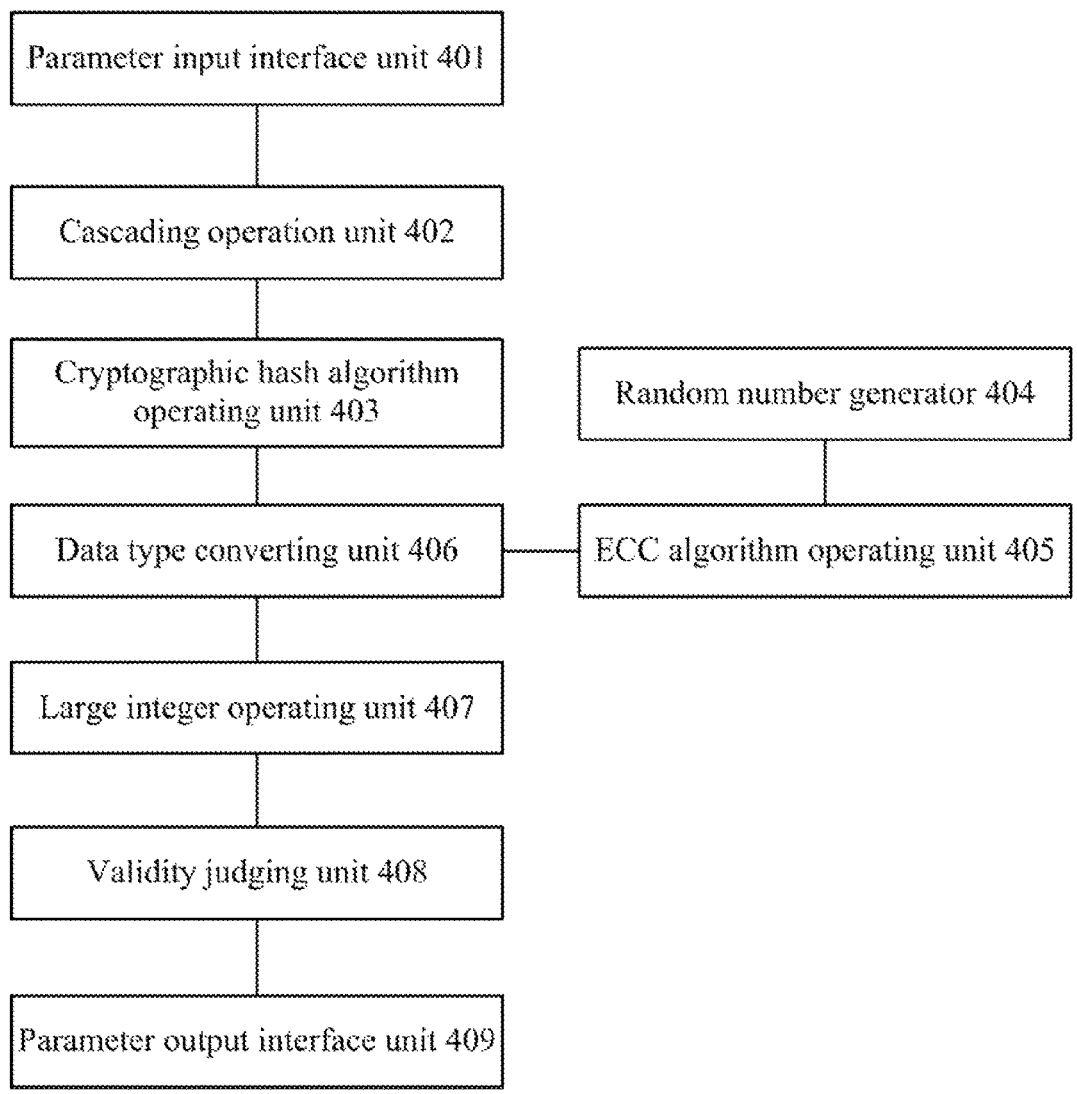
FIG. 4 illustrates a schematic diagram of a device according to an embodiment of the invention.

Based upon the same inventive idea as the method, an embodiment of the invention further provides a device for generating a digital signature, structured as illustrated in FIG. 4, which includes:

A parameter input interface unit 401 is configured to obtain a hash value $Z_A$ and a message M to be signed.

The parameter input interface unit 401 outputs the hash value $Z_A$ obtained and message M to be signed to a cascading operating unit 402.

The cascading operating unit 402 is configured to perform a cascading operation on the hash value $Z_A$ and the message M to be signed, obtained by the parameter input interface unit 401 to generate $\overline{M}$.

The cascading operating unit 402 outputs the $\overline{M}$ to a cryptographic hash algorithm operating unit 403.

The cryptographic hash algorithm operating unit 403 is configured to perform a cryptographic hash operation on $\overline{M}$ generated by the cascading operating unit 402 to generate message digest information e.

The cryptographic hash algorithm operating unit 403 outputs the message digest information e generated to a data type converting unit 406.

A random number generator 404 is configured to generate a random number k in the range [1, n−1].

The random number generator 404 transmits the random number k generated to an ECC algorithm operating unit 405.

The ECC algorithm operating unit 405 is configured to perform an elliptical curve algorithm point multiplication operation $(x_1, y_1)=kG$ according to on the random number k generated by the random number generator 404 to obtain the abscissa $x_1$ of an elliptical curve point, where G represents an elliptical curve parameter The ECC algorithm operating unit 405 outputs the abscissa $x_1$ of the elliptical curve point to the data type converting unit 406.

The data type converting unit 406 is configured to convert the data type of the message digest information e generated by the cryptographic hash algorithm operating unit 403 into an integer type, and further convert the data type of the abscissa $x_1$ of the elliptical curve point, generated by the ECC algorithm operating unit 405 into an integer type.

The data type converting unit 406 outputs the message digest information e and abscissa $x_1$ of the elliptical curve point converted by the data type converting 406, to a large integer operating unit 407.

The large integer operating unit 407 is configured to generate a digital signature parameter r using the message digest information e and abscissa $x_1$ of the elliptical curve point converted by the data type converting unit 406.

The large integer operating unit 407 outputs the digital signature parameter r generated to a validity judgment unit 408.

The validity judgment unit 408 is configured to judge the validity of the digital signature parameter r generated by the large integer operating unit 407.

If the digital signature parameter r does not satisfy a validity judgment condition, then the random number generator 404 regenerates a random number k in the range [1, n−1]; the ECC algorithm operating unit 405 obtains again an abscissa $x_1$ of an elliptical curve point using the random number k regenerated by the random number generator 404; the data type converting unit 406 converts the data type of the abscissa $x_1$ of the elliptical curve point, obtained again; the large integer operating unit 407 regenerate a digital signature parameter r using the message digest information e and the abscissa $x_1$ of the elliptical curve point converted; and the validity judgment unit 408 judges again the validity of the digital signature parameter r regenerated using the digital signature parameter r regenerated and the random number k regenerated.

Here if the digital signature parameter r does not satisfy the validity judgment condition, then the random number generator 404 can be triggered by the validity judgment unit 408 to regenerate the random number, or the random number generator 404 can be triggered by an additional control unit to regenerate the random number.

The large integer operating unit 407 is further configured to generate a digital signature parameter s using a private key $d_A$, the random number k generated by the random number generator 404, the digital signature parameter r, and an elliptical curve parameter n in the equation of: $s=((1+d_A)^{-1}\cdot(r+k)-r)\bmod n$.

The validity judgment unit 408 is further configured to judge whether the digital signature parameter s generated by the large integer operating unit 407 is 0.

If the digital signature parameter s is 0, then the random number generator 404 regenerates a random number k in the range [1, n−1], and the large integer operating unit 407 regenerates a digital signature parameter r, and if the digital signature parameter r regenerated satisfies the validity judgment condition, then the large integer operating unit regenerates a digital signature parameter s using the private key $d_A$, the random number k regenerated in the range [1, n−1], the digital signature parameter r regenerated, and the elliptical curve parameter n.

The data type converting unit 406 is further configured to convert the data type of the digital signature parameter r, and the digital signature parameter s which is not 0, finally generated by the large integer operating unit 407 into a string of bytes to obtain a digital signature (r, s).

A parameter output interface unit 409 is configured to output the digital signature (r, s).

Preferably the large integer operating unit 407 configured to generate the digital signature parameter s is configured:

To perform a large integer addition operation on the digital signature parameter r, and the random number k generated by the random number generator 404, and then perform an operation of a result (r+k) of the large integer addition operation modulo the elliptical curve parameter n;

To add 1 to the private key $d_A$, and then calculate a modular inverse of $(1+d_A)$ modulo the elliptical curve parameter n;

To perform a large integer multiplication operation on a result of the large integer addition operation result modulo n, and a result of the modular inverse; and To subtract the digital signature parameter r from a result of the large integer multiplication operation, and then perform an operation of a result of the large integer multiplication operation, after the digital signature parameter r being subtracted, modulo the elliptical curve parameter n to obtain the digital signature parameter s.

Further to the embodiment illustrated in FIG. 4, preferably if the validity judgment unit 408 judges the validity of the digital signature parameter r using an operation result r+k of the validity judgment condition on the digital signature parameter r, then the large integer operating unit 407 further generates the operation result r+k of the validity judgment condition on the digital signature parameter r using the digital signature parameter r generated, and the random number k generated by the random number generator 404 after generating the digital signature parameter r; and The large integer operating unit 407 configured to generate the digital signature parameter s is configured:

To perform an operation of result (r+k) modulo the elliptical curve parameter n;

To add 1 to the private key $d_A$, and then calculate a modular inverse of $(1+d_A)$ modulo the elliptical curve parameter n;

To perform a large integer multiplication operation on a result of (r+k) modulo n, and a result of the modular inverse; and To subtract the digital signature parameter r from a result of the large integer multiplication operation, and then perform an operation of a result of the large integer multiplication operation, after the digital signature parameter r being subtracted, modulo the elliptical curve parameter n to obtain the digital signature parameter s.

Further to the embodiment illustrated in FIG. 4, preferably if the validity judgment unit 408 judges the validity of the digital signature parameter r using an operation result (r+k)mod n of the validity judgment condition on the digital signature parameter r, then the large integer operating unit 407 further generates the operation result (r+k)mod n of the validity judgment condition on the digital signature parameter r using the digital signature parameter r generated; the random number k generated by the random number generator 404, and the elliptical curve parameter n after generating the digital signature parameter r; and The large integer operating unit 407 configured to generate the digital signature parameter s is configured:

To add 1 to the private key $d_A$, and then calculate a modular inverse of $(1+d_A)$ modulo the elliptical curve parameter n;

To perform a large integer multiplication operation on the operation result (r+k)mod n, and a result of the modular inverse; and To subtract the digital signature parameter r from a result of the large integer multiplication operation, and then perform an operation of a result of the large integer multiplication operation, after the digital signature parameter r being subtracted, modulo the elliptical curve parameter n to obtain the digital signature parameter s.

Further to any one of the embodiments illustrated in FIG. 4, the private key $d_A$ used by the large integer operating unit 407 can be generated by the device, or can be obtained from the outside, as described below by way of an example.

First Implementation:

The device according to the embodiment of the invention further includes a key generating unit and a key storing unit, where the key generating unit is configured to generate the private key $d_A$, and the key storing unit is configured to store the private key $d_A$ generated by the key generating unit.

Accordingly the large integer operating unit 407 obtains the private key $d_A$ from the key storing unit to generate the digital signature parameter s.

Second Implementation:

The parameter input interface unit 401 is further configured to obtain the private key $d_A$.

Accordingly the large integer operating unit 407 obtains the private key $d_A$ from the parameter input interface unit 401 to generate the digital signature parameter s.

Third Implementation:

The device according to the embodiment of the invention further includes a key storing unit.

The parameter input interface unit 401 is further configured to obtain the private key $d_A$; and the key storing unit is configured to store the private key $d_A$ obtained by the parameter input interface unit 401.

Accordingly the large integer operating unit 407 obtains the private key $d_A$ from the key storing unit to generate the digital signature parameter s.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of generating a digital signature applied in a field of user identity authentication, the method comprising:

generating, by a digital signature generator, a digital signature parameter r satisfying a validity judgment condition;

generating, by the digital signature generator, a digital signature parameter s using a private key $d_A$, a random number k in the range [1, n−1], the digital signature parameter r, and an elliptical curve parameter n in the equation of:

$$s=((1+d_A)^{-1}\cdot(r+k)-r)\bmod n;$$

judging, by the digital signature generator, whether the digital signature parameters is 0, and if the digital signature parameter s is 0, then regenerating a digital signature parameter r satisfying the validity judgment condition, and regenerating the digital signature parameter s using the private key $d_A$, a regenerated random number k in the range [1, n−1], the digital signature parameter r regenerated, and the elliptical curve parameter n until the digital signature parameters is not 0; and converting, by the digital signature generator, the data type of the resulting digital signature parameter r and digital signature parameter s which is not 0 into a string of bytes to obtain a digital signature (r, s);

outputting, by the digital signature generator, the digital signature (r, s), so that the digital signature (r, s) can be used by a digital signature user to participate in the user identity authentication; wherein the digital signature user is a system or a device or a network node participating in the user identity authentication;

wherein generating, by the digital signature generator, the digital signature parameter s in the equation of $s=((1+d_A)^{-1}\cdot(r+k)-r)\bmod n$ comprises:

after performing a large integer addition operation on the digital signature parameter r and the random number k, performing, by the digital signature generator, an operation of a result (r+k) of the large integer addition operation modulo the elliptical curve parameter n, and after adding 1 to the private key $d_A$, calculating, by the digital signature generator, a modular inverse of $(1+d_A)$ modulo the elliptical curve parameter n;

performing, by the digital signature generator, a large integer multiplication operation on a result of the large integer addition operation result modulo n, and a result of the modular inverse; and performing, by the digital signature generator, an operation of the large integer multiplication operation result, after the digital signature parameter r being subtracted, modulo the elliptical curve parameter n to obtain the digital signature parameter s; or performing, by the device digital signature generator, an operation of the result of the large integer multiplication operation result module n, after the digital signature parameter r being subtracted, modulo the elliptical curve parameter n to obtain the digital signature parameter s.

2. The method according to claim 1, wherein before the digital signature parameter s is generated, the method further comprises:

obtaining, by the digital signature generator, an operation result r+k of the validity judgment condition on r to generate the digital signature parameter s using the private key $d_A$, the operation result r+k of the validity judgment condition on r, the digital signature parameter r, and the elliptical curve parameter n.

3. The method according to claim 1, wherein before the digital signature parameter s is generated, the method further comprises:

obtaining, by the digital signature generator, an operation result (r+k) mod n of the validity judgment condition on r to generate the digital signature parameter s using the private key $d_A$, the operation result (r+k) mod n of the validity judgment condition on r, the digital signature parameter r, and the elliptical curve parameter n.

4. A digital signature generator, applied in a field of user identity authentication, the digital signature generator comprising a memory and a processor, the memory communicatively connected to the processor, wherein:

the memory stores instructions executable by the processor; and the processor executes the instructions to obtain a hash value $Z_A$ and a message M to be signed;

perform a cascading operation on the hash value $Z_A$, and the message M to be signed to generate $\overline{M}$;

perform a cryptographic hash operation on $\overline{M}$ to generate message digest information e;

generate a random number k in the range [1, n−1];

perform an elliptical curve point multiplication operation $(x_1, y_1)=kG$ according to the random number k to obtain the abscissa $x_1$ of an elliptical curve point, wherein G represents an elliptical curve parameter;

convert the data type of the message digest information e into an integer type, and further convert the data type of the abscissa $x_1$ of the elliptical curve point into an integer type;

generate a digital signature parameter r using the message digest information e and abscissa $x_1$ of the elliptical curve point;

judge the validity of the digital signature parameter r; and if the digital signature parameter r does not satisfy a validity judgment condition, then regenerates a random number k in the range [1, n−1]; obtain again an abscissa $x_1$ of an elliptical curve point using the random number k; converts the data type of the abscissa $x_1$ of the elliptical curve point, obtained again; regenerate a digital signature parameter r using the message digest information e and the abscissa $x_1$ of the elliptical curve point converted; and judges again the validity of the digital signature parameter r regenerated using the digital signature parameter r regenerated and the random number k regenerated;

wherein the processor is further configured to generate a digital signature parameters using a private key $d_A$, the random number k, the digital signature parameter r, and an elliptical curve parameter n in the equation of: $s=((1+d_A)^{-1}\cdot(r+k)-r)\bmod n$;

the processor is further configured to judge whether the digital signature parameter s is 0; if the digital signature parameter s is 0, then regenerate a random number k in the range [1, n−1], and regenerate a digital signature parameter r, and if the digital signature parameter r regenerated satisfies the validity judgment condition, then regenerates a digital signature parameter s using the private key $d_A$, the random number k regenerated in the range [1, n−1], the digital signature parameter r regenerated, and the elliptical curve parameter n;

the processor is further configured to convert the data type of the digital signature parameter r, and the digital signature parameter s which is not 0, finally generated into a string of bytes to obtain a digital signature (r, s); and the processor configured to output the digital signature (r, s), so that the digital signature (r, s) can be used by a digital signature user to participate in the user identity authentication; wherein the digital signature user is a system or a device or a network node participating in the user identity authentication;

wherein the processor configured to generate the digital signature parameter s is configured to:

perform a large integer addition operation on the digital signature parameter r, and the random number k, and then perform an operation of a result (r+k) of the large integer addition operation modulo the elliptical curve parameter n, and to add 1 to the private key $d_A$, and then calculate a modular inverse of $(1+d_A)$ modulo the elliptical curve parameter n;

perform a large integer multiplication operation on a result of the large integer addition operation result modulo n, and a result of the modular inverse; and perform an operation of a result of the large integer multiplication operation, after the digital signature parameter r being subtracted, modulo the elliptical curve parameter n to obtain the digital signature parameter s; or to perform an operation of the result of the large integer multiplication operation result module n, after the digital signature parameter r being subtracted, modulo the elliptical curve parameter n to obtain the digital signature parameter s.

5. The digital signature generator according to claim 4, wherein if the processor judges the validity of the digital signature parameter r using an operation result r+k of the validity judgment condition on the digital signature parameter r, then the processor further generates the operation result r+k of the validity judgment condition on the digital signature parameter r using the digital signature parameter r generated, and the random number k generated after generating the digital signature parameter r; and the processor configured to generate the digital signature parameter s is configured to:

perform an operation of the result (r+k) modulo the elliptical curve parameter n;

add 1 to the private key $d_A$, and then calculate a modular inverse of $(1+d_A)$ modulo the elliptical curve parameter n;

perform a large integer multiplication operation on a result of (r+k) modulo n, and a result of the modular inverse; and subtract the digital signature parameter r from a result of the large integer multiplication operation, and then perform an operation of a result of the large integer multiplication operation, after the digital signature parameter r being subtracted, modulo the elliptical curve parameter n, resulting in the digital signature parameter s.

6. The digital signature generator according to claim 5, wherein the processor is further configured to:

generate the private key $d_A$; and the memory configured to store the private key $d_A$ generated; and the processor is further configured to obtain the private key $d_A$ from the memory to generate the digital signature parameter s.

7. The digital signature generator according to claim 5, wherein:

the processor is further configured to obtain the private key $d_A$ to generate the digital signature parameter s; or the processor is further configured to obtain the private key $d_A$; the memory is configured to store the private key $d_A$ obtained; and the processor further obtains the private key $d_A$ from the memory to generate the digital signature parameter s.

8. The digital signature generator according to claim 4, wherein if the processor judges the validity of the digital signature parameter r using an operation result (r+k) mod n of the validity judgment condition on the digital signature parameter r, then the processor further generates the operation result (r+k) mod n of the validity judgment condition on the digital signature parameter r using the digital signature parameter r generated, the random number k generated, and the elliptical curve parameter n after generating the digital signature parameter r; and the processor configured to generate the digital signature parameter s is configured to:

add 1 to the private key $d_A$, and then calculate a modular inverse of $(1+d_A)$ modulo the elliptical curve parameter n;

perform a large integer multiplication operation on the operation result (r+k) mod n and a result of the modular inverse; and subtract the digital signature parameter r from a result of the large integer multiplication operation, and then perform an operation of a result of the large integer multiplication operation, after the digital signature parameter r being subtracted, modulo the elliptical curve parameter n to obtain the digital signature parameter s.

9. The digital signature generator according to claim 8, wherein the processor is further configured to:

generate the private key $d_A$; and the memory configured to store the private key $d_A$ generated; and the processor is further configured to obtain the private key $d_A$ from the memory to generate the digital signature parameter s.

10. The digital signature generator according to claim 8, wherein:

the processor is further configured to obtain the private key $d_A$ to generate the digital signature parameter s; or the processor is further configured to obtain the private key $d_A$; the memory is configured to store the private key $d_A$ obtained; and the processor further obtains the private key $d_A$ from the memory to generate the digital signature parameter s.

11. The digital signature generator according to claim 4, wherein the processor further configured to:

generate the private key $d_A$; and the memory further stores the private key $d_A$ generated; and the processor is further configured to obtain the private key $d_A$ from the memory to generate the digital signature parameter s.

12. The digital signature generator according to claim 4, wherein:

the processor is further configured to obtain the private key $d_A$ to generate the digital signature parameter s; or the processor is further configured to obtain the private key $d_A$; the memory is configured to store the private key $d_A$ obtained; and the processor further obtains the private key $d_A$ from the memory to generate the digital signature parameter s.

13. A digital signature generator, applied in a field of user identity authentication, the generator comprising a processor and a chip, wherein:

the processor is configured to obtain a hash value $Z_A$ and a message M to be signed; and to perform a cascading operation on the hash value $Z_A$ and the message M to be signed to generate $\overline{M}$;

the chip is configured to:

perform a cryptographic hash operation on $\overline{M}$ to generate message digest information e;

generate a random number k in the range [1, n−1];

perform an elliptical curve point multiplication operation $(x_1, y_1) = kG$ according to the random number k to obtain the abscissa $x_1$ of an elliptical curve point, wherein G represents an elliptical curve parameter;

convert the data type of the message digest information e into an integer type, and further convert the data type of the abscissa $x_1$ of the elliptical curve point, into an integer type; and generate a digital signature parameter r using the message digest information e and abscissa $x_1$ of the elliptical curve point;

wherein the processor is further configured to:

judge the validity of the digital signature parameter r;

the chip is further configured to:

if the digital signature parameter r does not satisfy a validity judgment condition, then regenerates a random number k in the range [1, n−1]; obtains again an abscissa $x_1$ of an elliptical curve point using the random number k; convert the data type of the abscissa $x_1$ of the elliptical curve point, obtained again; and regenerates a digital signature parameter r using the message digest information e and the abscissa $x_1$ of the elliptical curve point converted;

wherein the processor is further configured to judge again the validity of the digital signature parameter r regenerated using the digital signature parameter r regenerated and the random number k regenerated;

the chip is further configured to generate a digital signature parameter s using a private key $d_A$, the random number k, the digital signature parameter r, and an elliptical curve parameter n in the equation of: $s=((1+d_A)^{-1} \cdot (r+k)-r) \mod n$;

wherein the processor is further configured to judge whether the digital signature parameter s generated by the chip is 0;

the chip is further configured to:

if the digital signature parameter s is 0, then regenerate a random number k in the range [1, n−1], regenerate a digital signature parameter r, and if the digital signature parameter r regenerated satisfies the validity judgment condition, then regenerates a digital signature parameter s using the private key $d_A$, the random number k regenerated in the range [1, n−1], the digital signature parameter r regenerated, and the elliptical curve parameter n; and convert the data type of the digital signature parameter r, and the digital signature parameter s which is not 0, finally generated into a string of bytes to obtain a digital signature (r, s);

wherein the processor is further configured to output the digital signature (r, s), so that a digital signature user can use the digital signature (r, s) to participate in the user identity authentication; wherein the digital signature user is a system or a device or a network node participating in the user identity authentication;

wherein the chip is further configured to:

perform a large integer addition operation on the digital signature parameter r, and the random number k, and then perform an operation of a result (r+k) of the large integer addition operation modulo the elliptical curve parameter n;

add 1 to the private key $d_A$, and then calculate a modular inverse of $(1+d_A)$ modulo the elliptical curve parameter 11;

perform a large integer multiplication operation on a result of the large integer addition operation result modulo n, and a result of the modular inverse; and perform an operation of a result of the large integer multiplication operation, after the digital signature parameter r being subtracted, modulo the elliptical curve parameter n to obtain the digital signature parameter s; or to perform an operation of the result of the large integer multiplication operation result module n, after the digital signature parameter r being subtracted, modulo the elliptical curve parameter n to obtain the digital signature parameter s.

\* \* \* \* \*